3,189,585
2-VINYL-6,6-DIMETHYLNORPINANE AND
POLYMERS THEREOF
Newton H. Shearer, Jr., Kingsport, Tenn., assignor to Eastman Kodak Company, Rochester, N.Y., a corporation of New Jersey
No Drawing. Filed Aug. 11, 1960, Ser. No. 48,851
17 Claims. (260—88.2)

This invention relates to novel organic compounds and processes for their preparation. More particularly, this invention relates to a new monomer and its process of preparation. In a more specific aspect, this invention relates to new homo- and copolymers prepared from the aforementioned new monomer.

As will be apparent from the discussion hereinafter, the new monomer of this invention can be polymerized to form homo- and copolymers having properties which render them particularly useful in the formation of fibers. Hence, it is well known that poly-$\alpha$-olefins, particularly the poly-$\alpha$-olefins which are partially or completely crystalline, can be spun into synthetic fibers having unusual physical properties. The conventional prior art polymers are, however, subject to inherent disabilities which greatly restrict their utility in the fabrication of general purpose fibers. For example, polypropylene which is a typical high molecular weight fiber-forming crystalline poly-$\alpha$-olefin has a melting point of only about 170 to about 175° C. which is a significant limitation with respect to ironing temperature and in applications requiring resistance to heat, for example, for use in tire cord. Conversely, poly-$\alpha$-olefins such as 3-methyl-1-butene and 4-methyl-1-pentene which have extremely high melting points of about 300° C. and about 245° C., respectively, must be processed at high temperatures, which temperatures are in excess of the "threshold temperature," i.e. the thermal degradation temperature, for the polymer. Consequently, polymers such as these degrade during processing, thus resulting in a rapid reduction in molecular weight with the formation of fibers having non-uniform properties. In addition, these fibers tend to be brittle as they cool coming out of the melt spinning cabinet, and they are quite difficult to handle. Hence, it is most desirable to obtain new high molecular weight poly-$\alpha$-olefins which will form fibers which are free from the aforementioned disabilities in order to increase the value of poly-$\alpha$-olefin fibers in the textile field. It is evident, therefore, that the state of the art will be greatly enhanced by providing a new $\alpha$-olefin monomer which is capable of forming homo- and copolymers which can be spun into fibers that are free from the aforementioned limitations while still retaining the desirable fiber-forming properties, e.g. high tenacity and low elongation, that are characteristic of poly-$\alpha$-olefins.

Accordingly, it is an object of this invention to provide novel organic compounds and processes for their preparation.

Another object of this invention is to provide new $\alpha$-olefin monomers and a process for their preparation.

Still another object of this invention is to provide new homo- and copolymers of the aforementioned monomers and processes for their preparation.

Still another object of this invention is to provide new homo- and copolymers which can be spun into fibers which are high softening.

Still another object of this invention is to provide new homo- and copolymers which can be spun from conventional equipment to give high softening fibers exhibiting uniform properties such as uniform diameter and high tenacity.

Other objects of this invention will become apparent from an examination of the discussion and claims which follow.

In accordance with this invention it has unexpectedly been found that a new $\alpha$-olefin monomer, i.e. 2-vinyl-6,6-dimethylnorpinane, can be polymerized to form high softening polymers which can be processed below their threshold temperature to form useful fibers having uniform properties.

It is well known that fibers must be stabilized, i.e. heat treated, to essentially eliminate hot water shrinkage. In addition, it is also desirable to obtain an oriented fiber since orientation gives the fiber strength. A significant feature of this invention is that fibers spun from the new homo- and copolymers of our invention can be stabilized without disorientation to form fibers which are both crystalline and oriented. These high softening, substantially crystalline, oriented fibers are eminently suitable for use in the textile field. Hence, poly(2-vinyl-6,6-dimethylnorpinane) does not show brittle behavior during subsequent drafting of spun fibers and fibers of 8 to 9 grams per denier can be obtained by drafting these spun fibers 800 to 1,000%.

Poly(2-vinyl-6,6-dimethylnorpinane) is unique among the polyolefins softening above 200° C. since it combines an excellent level in softening point with ease of handling. In contrast, however, as indicated above, poly(3-methyl-1-butene) and poly(4-methyl-1-pentene), for example, are actually so high softening that they cannot be processed without degradation and so highly crystalline that they are quite brittle, both in fiber form as well as in molded articles. Thus, it can readily be seen that poly-(2-vinyl-6,6-dimethylnorpinane) represents a new polyolefin having an unusual combination of properties, i.e. it is high softening, has good fiber-forming properties and it exhibits good processing characteristics.

An additional and extremely significant limitation upon the use of poly-$\alpha$-olefins in the fabrication of general purpose fibers has been their poor affinity for dyestuffs. For example, a high molecular weight fiber-forming crystalline polyolefin is a relatively insoluble, chemically inert hydrophobic material. Since it is not readily permeable to water, it cannot be dyed satisfactorily by the ordinary dyeing procedures. Since it is relatively inert chemically, it cannot be permanently dyed even with hydrocarbon soluble dyestuffs. Furthermore, substantially crystalline poly-$\alpha$-olefin yarns and fibers cannot be dyed readily with a wide variety of dispersed and premetallized dyes nor can such yarns and fibers be dyed to deep shades having good light and gas fastness. It has been found, however, that the fibers spun from the new homo- and copolymers of our invention exhibit excellent dye affinity and light and gas fastness when they are modified with small amounts of polymeric materials such as polymers of specific acrylates, methacrylates, vinyl pyridines, N-substituted acrylamides and polyvinyl acetal resins.

The unique monomer of this invention, i.e. 2-vinyl-6,6-dimethylnorpinane can be made by any of the conventional procedures for the synthesis of $\alpha$-olefins available to the prior art. However, a preferred synthesis involves the preparation of 2-vinyl-6,6-dmethylnorpinane by reacting hydronopol [J.A.C.S. 68, 638 (1946)] with acetic anhydride in the presence of sulfuric acid and subsequently pyrolyzing the acetate according to the equations set forth below.

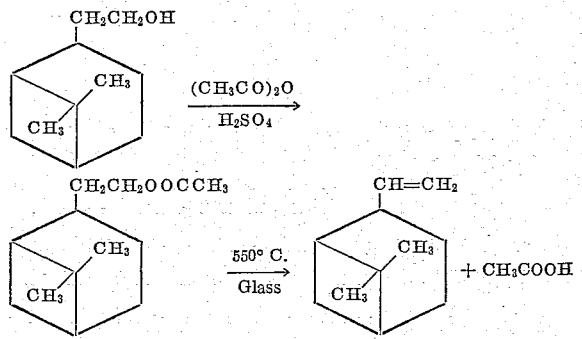

The 2-vinyl-6,6-dimethylnorpinane which results from this reaction has a boiling point of 69–72° C. under 10 mm. pressure.

Polymers which are formed from the 2-vinyl-6,6-dimethylnorpinane of our invention have the aforementioned unique combination of properties which make them eminently suitable in the formation of fibers. In addition, these polymers, and particularly poly(2-vinyl-6,6-dimethylnorpinane), are extremely valuable in that they possess the unique combination of high softening point with good impact strength and ease of handling in molding and extrusion operations. For example, poly(3-methyl-1-butene), which is a well known high softening polymer, has a notched Izod impact strength at room temperature of less than 0.3 ft. lb. per inch of notch in the form of molded tensile specimens. In contrast, the new high softening poly(2-vinyl-6,6-dimethylnorpinane) of this invention has an Izod impact strength in excess of 1.0 ft. lb. per inch of notch. Furthermore, copolymers containing about 85 to 95%, by weight, of 2-vinyl-6,6-dimethylnorpinane with an α-olefin show Izod impact strengths in excess of 1.5 ft. lb. per inch of notch. Moreover, copolymers of 2-vinyl-6,6-dimethylnorpinane with an α-olefin containing less than 85%, by weight, of the former are particularly useful blending agents. Hence, they can be blended with crystalline polypropylene in about 10 to 20%, weight concentrations, to reduce the brittleness temperature of polypropylene to within the range of about −15 to −30° C. as compared with the +15° C. brittleness temperature which characterizes unmodified polypropylene.

In general, it has been found that the homopolymers prepared according to the process of this invention exhibit molecular weights greater than about 1,000 and generally within the range of about 10,000 to about 250,000 with molecular weights of 20,000 to 60,000 being preferred for fiber formation. The molecular weights of these polymers are conveniently determined by measuring the inherent viscosity in tetralin at 145° C. which, in the instant case, ranges from about 0.03 to about 6.4 and, is preferably within the range of about 0.45 to about 1.6 for fiber formation. The softening points of the homopolymers are generally in excess of 200° C. and usually within the range of about 235 to about 240° C. with densities of at least 0.87 and generally within the range of about 0.88 to 0.91. In some cases, it is desirable to prepare copolymers of the 2-vinyl-6,6-dimethylnorpinane of our invention in order to modify these properties for particular uses such as molding or extrusion applications. Thus, it has been found that α-olefins in general, and specifically α-olefins containing 2 to 12 carbon atoms, are eminently suitable for use as comonomers. Hence, the 2-vinyl-6,6-dimethylnorpinane of our invention can be copolymerized with α-olefins such as, for example, styrene, butadiene, ethylene, propylene, pentene, hexene, decene, dodecene, 5-methyl-1-hexene, 1-hexene, allylcyclohexane, 4-methyl-1-pentene, allylcyclopentene and the like or mixtures thereof. The resulting copolymers are, of course, subject to wide variation in properties due to the variety of α-olefins which can be copolymerized with the new monomer of our invention. Thus, it is possible to obtain copolymers which exhibit a desired combination of properties for a particular application.

The polymerizaton reaction can be carried out continuously or batchwise, in solution or in slurry, or in the absence of solvent. Furthermore, chain transfer agents, for example, hydrogen, can be employed in the polymerization process to regulate the molecular weight of the homo- and copolymer being formed.

The catalysts which are employed in the polymerization reaction are an important feature of the process and include any of the conventional solid stereospecific catalysts known in the prior art. These catalysts contain at least two components, namely, a transition element halide in combination with an activator therefor. These catalysts include, for example, mixtures containing a halide of a transition element from the 4th to the 6th subgroups of the Periodic Table in combination with a metal of Group I-A or Group II or aluminum or with an alloy of metals of Group I-A and/or II and/or aluminum or with a halide or organometallic compound of a metal of Group I-A or II and/or aluminum or with a complex hydride of a metal of Group I-A or II of the Periodic Table. The Periodic Table referred to herein can be found in "Lange's Handbook of Chemistry," 8th edition (1952), published by Handbook Publishers, Inc., at pages 56 and 57.

The transition metals included in Groups IV-B through VI-B of the Periodic Table are exemplified by metals such as titanium, zirconium, vanadium, molybdenum, chromium and the like. The transition metal halide catalyst components can be used at their maximum valency or if desired a reduced valency form of the halide can be employed. Examples of transition metal halides that can be employed in the process of this invention include titanium tetrachloride, titanium tetrabromide, titanium trichloride, titanium tribromide, zirconium tetrachloride, vanadium trichloride, molybdenum pentachloride, chromium trichloride and the like.

Suitable activators which can be employed in conjunction with the transition element halides include, for example, metal alkyl, metal alkyl halide and metal hydrides of aluminum or Group I-A and II-A metals as well as the metals alone as exemplified by sodium, potassium, lithium, zinc, sodium amyl, potassium butyl, lithium propyl, zinc dibutyl, zinc diamyl, zinc dipropyl, ethyl magnesium bromide, sodium hydride, calcium hydride, lithium aluminum hydride, aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. In addition, a third component can be employed in order to increase the stereospecificity of the catalyst and to reduce the formation of oils and amorphous polymers. A particular advantage in employing a third component is that polymers with crystallinities in the order of 99% can be obtained directly from the reactor. Accordingly, a separate extraction step to obtain highly crystalline products is not necessary. Suitable third components include the halides of alkali metals, magnesium oxide, aromatic ethers, hydrides of sodium, potassium and lithium, and alcoholates of sodium, potassium, lithium, calcium, magnesium, barium, strontium, aluminum, titanium and zirconium. Furthermore, it is often desirable to employ tertiary amines and tertiary phosphoramides as third components with, for example, alkyl aluminum halides.

Generally a molecular ratio of activator to metal halide of 0.1:1 to 12:1 is satisfactory in the practice of this invention. Where a third component is employed the molecular ratios of metal halide to third component of about 1:0.1 to about 1:2, are generally satisfactory. The concentrations of the catalyst in the reaction medium can be varied over a wide range. For example, catalyst concentrations of 0.1% or less up to 3% or more can be used.

In general, it has been found that temperatures varying from about room temperature to about 150° C., with temperatures within the range of about 40 to about 90° C. being preferred can be employed in the polymerization with satisfactory results, although temperature as low as 0° C. or as high as 250° can be employed in the polymerization if desired. Usually, however, it is not desirable or economical to effect the polymerization at temperature below 0° C. and the process can be readily controlled at room temperature or higher which is an advantage from the standpoint of commercial processing. The pressure employed is usually only sufficient to maintain the reaction mixture in liquid form where a liquid is employed during the polymerization although higher pressure can be used if desired. In general, it has been found that pressure varying from atmospheric to about 1,000 p.s.i. can be used with satisfactory results.

As indicated above, the polymerization process can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle when employed can be varied over rather wide limits with relation to the monomer and catalyst mixture. Best results are obtained using a concentration of catalyst of from about 0.1% to about 2% by weight based on the weight of the vehicle. The concentration of the monomer in a vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher, are preferred. Higher concentrations of monomer ordinarily increase the rate of polymerization, but concentrations above 5–10% by weight in a solution process are ordinarily less desirable because the polymer dissolved in the reaction medium results in a very viscous solution.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, and any of the other well-known inert liquid hydrocarbons. The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

This invention can be further illustrated by the following examples of preferred embodiments thereof although it will be understood that these examples are included merely for purposes of illustration and are not intended to limit the scope of the invention unless otherwise specifically indicated:

Example 1

The unique monomer which forms a part of this invention can be synthesized according to the equation set forth above. Thus, 36 grams of hydronopol is reacted with 27 g. of acetic anhydride in the presence of 6 drops of concentrated sulfuric acid at a temperature of 80–100° C. The acetic acid is removed from the resulting reaction mixture by distillation at atmospheric pressure and the resulting hydronopol acetate is pyrolyzed by passing over Pyrex Raschig rings at 550° C. After fractional distillation 28 g. of 2-vinyl-6,6-dimethylnorpinane boiling at 69–72° C./10 mm. was obtained.

Example 2

The new 2-vinyl-6,6-dimethylnorpinane monomer is extremely useful in the preparation of high softening polymers which are suitable for fiber formation. Hence, in a nitrogen-filled dry box, a 7-oz. tapered pressure bottle was charged with 40 ml. of dry benzene, 20 g. of 2-vinyl-6,6-dimethylnorpinane, and 1 g. of a catalyst consisting of triethylaluminum and titanium trichloride in a molar ratio of 1:1. The bottle was capped, placed on a rotating wheel in a constant temperature water bath maintained at 70° C. and allowed to remain under these conditions for 24 hr. At the end of this period, the bottle was removed, allowed to cool and opened. The reaction mixture was diluted with isobutyl alcohol and was transferred to a Waring Blendor. The polymer was washed several times with hot isobutyl alcohol in the Blendor and was dried. The poly(2-vinyl-6,6-dimethylnorpinane) was a hard, white powder and weighed 12 g. The inherent viscosity of this polymer was 2.83 in Tetralin at 145° C.

When the inherent viscosity of the polymer is reduced to 1.0–1.6 by cracking in vacuo at 325° C. for 1 hr., the resulting material can be readily melt spun into draftable fibers. The crystalline melting point of an oriented fiber sample was about 300° C. In addition to forming excellent high softening fibers, this crystalline polymer could be pressed into thin transparent film at about 310° C.

*Example 3*

As previously stated, copolymers of 2-vinyl-6,6-dimethylnorpinane with α-olefins will exhibit excellent toughness. To illustrate this aspect of the invention: Inside a nitrogen-filled dry box, a 285-ml., stainless steel autoclave was charged with 100 ml. of dry mineral spirits, 50 g. of 2-vinyl-6,6-dimethylnorpinane, and 2 g. of catalyst comprising a 2:1:3 molar ratio of ethylaluminum sesquichloride, hexamethylphosphoric triamide and vanadium trichloride. The autoclave was sealed, placed in a rocker and attached to a source of liquid 1-butene. After the addition of 20 g. of 1-butene, rocking was initiated and the mixture was heated to 80° C. and maintained at this temperature for 6 hrs. The product was washed and dried as prescribed in Example 2 to give a yield of 60 g. of polymer. This polymer was extracted with ethyl ether and then with heptane at 80° C. The total yield of copolymer having an inherent viscosity in Tetralin at 145° C. of 2.12 was 34 g.

The copolymer was mostly isolated from the heptane solution from which it could be cast into tough, flexible films or dry spun into strong, elastic fibers.

Propylene or ethylene could be substituted for the 1-butene in the above example to form copolymers of 2-vinyl-6,6-dimethylnorpinane with propylene or with ethylene.

*Example 4*

This example illustrates the preparation of another very valuable copolymer. Hence, the procedure of Example 2 was followed using a mixture of 20 g. of 2-vinyl-6,6-dimethylnorpinane and 10 g. of 1-hexene. The resulting reaction product was extracted first with ethyl ether and then with heptane at 80° C. The copolymer of 2-vinyl-6,6-dimethylnorpinane and 1-hexene, isolated largely from the heptane solution, weighed 10.5 g. and had an inherent viscosity in Tetralin at 145° C. of 1.93.

This copolymer can be molded or cast from heptane or chloroform solution into clear, flexible films. Fibers melt spun from this copolymer are strong and elastic. Other monomers which can be copolymerized with 2-vinyl-6,6-dimethylnorpinane in the above manner are 1-pentene, 1-octene, 3-methyl-1-butene, 4-methyl-1-pentene, styrene, 3-methyl-1-hexene, 5-methyl-1-hexene, allylcyclohexane, allylcyclopentane, and allylbenzene.

Thus, this invention provides the art with a new α-olefin which can be polymerized to form high softening homo- and copolymers which are especially suited for use in fiber formation. Hence, fabrics spun from such fibers exhibit excellent ironing temperature and resistance to heat. These fibers also exhibit low creep characteristics which make them highly useful in tire cord. In addition these polymers can be spun from conventional equipment to give high softening fibers exhibiting uniform properties. Furthermore, the polymers obtained in this invention can be extruded, mechanically milled, cast, or molded as desired to form clear, tough films. These polymers can also be blended with antioxidants, stabilizers, plasticizers, fillers, pigments and the like or mixed with other polymeric materials, waxes and the like. In general, aside from the relatively higher values for softening points and the like the polymers embodying this invention can be treated in a similar manner to those obtained by other processes in the prior art.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. 2-vinyl-6,6-dimethylnorpinane.
2. Solid poly(2-vinyl-6,6-dimethylnorpinane).
3. Solid copolymers of 2-vinyl-6,6-dimethylnorpinane with at least one α-olefin.
4. Solid copolymers of 2-vinyl-6,6-dimethylnorpinane with at least one α-olefin containing 2–12 carbon atoms.
5. Solid copolymers of 2-vinyl-6,6-dimethylnorpinane with at least one α-monoolefin containing 2–12 carbon atoms.
6. Solid copolymers of 2-vinyl-6,6-dimethylnorpinane with 3-methyl-1-butene.
7. Solid copolymers of 2-vinyl-6,6-dimethylnorpinane with styrene.
8. Solid copolymers of 2-vinyl-6,6-dimethylnorpinane with 5-methyl-1-hexene.
9. Solid copolymers of 2-vinyl-6,6-dimethylnorpinane with 1-hexene.
10. Solid copolymers of 2-vinyl-6,6-dimethylnorpinane with allylcyclohexane.
11. Solid copolymers of 2-vinyl-6,6-dimethylnorpinane with 4-methyl-1-pentene.
12. Solid copolymers of 2-vinyl-6,6-dimethylnorpinane with allylcyclopentane.
13. Solid copolymers of 2-vinyl-6,6-dimethylnorpinane with 1-pentene.
14. Solid poly(2-vinyl-6,6-dimethylnorpinane) fiber.
15. Fiber comprising essentially a solid copolymer of 2-vinyl-6,6-dimethylnorpinane with at least one α-monoolefin containing 2 to 12 carbon atoms.
16. A solid polymer of 2-vinyl-6,6-dimethylnorpinane having a molecular weight in the range of about 10,000 to about 250,000, a softening point in the range of about 200 to about 240° C. and a density in the range of about .87 to about .91.
17. A fiber of a solid polymer of 2-vinyl-6,6-dimethylnorpinane having a molecular weight in the range of about 20,000 to about 60,000, a softening point in the range of about 200 to about 240° C. and a density in the range of about .87 to about .91.

References Cited by the Examiner

UNITED STATES PATENTS

| | | | |
|---|---|---|---|
| 2,925,409 | 2/60 | Shearer et al. | 260—88.2 |
| 2,932,631 | 4/60 | Rummelsburg | 260—93.3 |
| 3,058,963 | 10/62 | Vandenberg | 260—93.3 |

FOREIGN PATENTS 796,135   6/58   Great Britain.

OTHER REFERENCES

Faraday's Encyclopedia of Hydrocarbon Compounds, Chemindex Limited, 76 Cross Street, Manchester, England, Sheet No. 11211.00.11.

JOSEPH L. SCHOFER, *Primary Examiner.*

L. H. GASTON, JAMES E. SEIDLECK, *Examiners.*